March 11, 1952     M. P. ELLIOTT     2,588,370
BEEHIVE
Filed Nov. 16, 1949

Mintie P. Elliott
INVENTOR.

BY *Clarence A. O'Brien*
*and Harvey B. Jacobson*
Attorneys

Patented Mar. 11, 1952

2,588,370

UNITED STATES PATENT OFFICE 2,588,370

BEEHIVE

Mintie P. Elliott, Glen Rose, Tex.

Application November 16, 1949, Serial No. 127,653

5 Claims. (Cl. 6—1)

This invention relates to improvements in bee hives, and the primary object of the invention is to provide an improved hive construction in which removable inverted jars are employed as honey receptacles.

A more specific object is to provide efficient means for supporting the jars in an inverted position within an upper compartment, whereby the bees may have ready access to the interior of said jars from the lower brood compartment of the hive through the necks of the jars.

Another object is to provide a landing at the top of the brood compartment close to and below the jars to facilitate passage of the beees to and from the latter.

Another object is to facilitate insertion and removal of the jars as well as inspection of the same to note the progress of the making and filling of combs therein.

The invention consists of the novel form, combination and arrangement of parts hereinafter described and shown in the accompanying drawing, in which.

Figure 1:
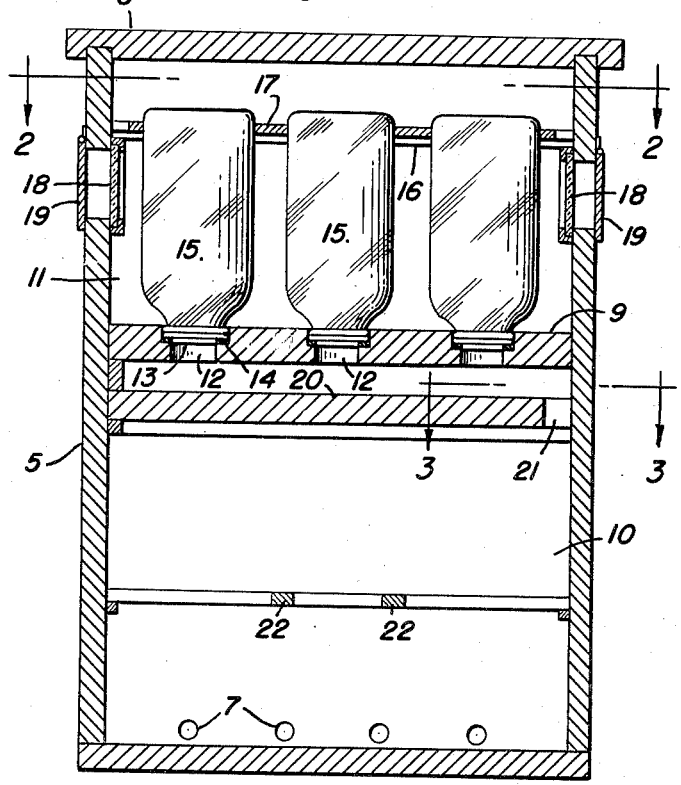
Figure 1 is a vertical sectional view of a bee hive embodying the present invention.
Figure 2:
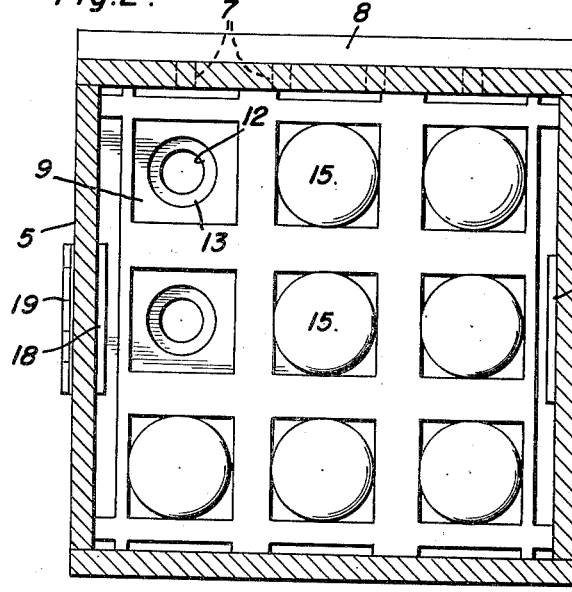
Figure 2 is a horizontal section taken on the line 2—2 of Figure 1 with two jars removed.
Figure 3:
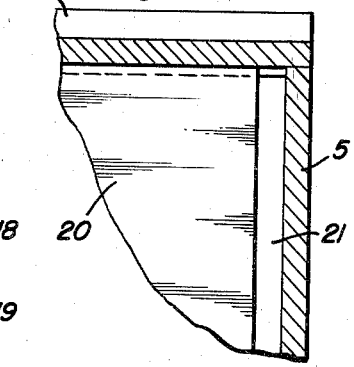
Figure 3 is a fragmentary horizontal section taken on the plane of line 3—3 of Figure 1.

Referring in detail to the drawing, 5 indicates the body of the bee hive consisting of a relatively deep rectangular box closed by a removable lid 6. A plurality of openings 7 are provided in the lower part of at least one side wall of the body for entrance and exit of the bees. The bottom wall of the body may be extended outwardly to provide a ledge 8, at each side where the openings 7 are provided, on which the bees may alight.

The interior of the body is divided by a horizontal partition 9 into a lower brood compartment 10 and an upper honey receptacle compartment 11. The partition 9 is provided with a plurality of openings 12 which are counterbored at the top to provide an annular shoulder 13 in each opening on which is placed a gasket ring 14. The neck of an inverted jar 15 is removably disposed in the counterbored portion of each opening 12 and seated on the gasket ring 14 disposed on the shoulder 13 of said opening. Thus, the jars 15 provide honey receptacles in the compartment 11, access to the interior of which is had by the bees from the chamber 10 through the openings 12. Removably supported upon ledges 16 within the upper compartment 11 is a horizontal grating 17 whose crossbars engage the upper portions of the jars 15 to hold them in a vertical position with their necks seated in the openings 12. The body 5 has windows 18 in walls thereof to facilitate inspection of the jars to determine the progress of the bees in making and filling combs therein. Hinged exterior blinds 19 may be provided for the windows 18. By removing the lid 6, the grating 17 and jars 15 may be readily inserted and removed.

Mounted in the body 5 at the top of compartment 10 and close to but below the partition 9 is a deck or partial partition forming a landing for the bees to facilitate their passage to and from the jars, one edge of the deck or partial partition being spaced from the adjacent wall of body 5 to provide a slot 21 through which the bees may pass from the compartment 10 to landing 20, and vice versa.

Diagonal horizontal bars 22 are supported in and above the bottom of the compartment 10 to support combs.

Having thus described the invention, what is claimed as new is:

1. A bee hive including a body having a removable lid and provided with openings near the bottom for entrance and exit of bees, a horizontal partition mounted in the body and dividing it into upper and lower compartments, said partition having a plurality of openings counterbored at the top to provide shoulders therein, an inverted jar associated with each opening and having its neck removably fitted in the latter and supported by the shoulder therein, a grating removably supported in the upper compartment and receiving upper portions of said jars to hold the jars upright.

2. A bee hive including a body having a removable lid and provided with openings near the bottom for entrance and exit of bees, a horizontal partition mounted in the body and dividing it into upper and lower compartments, said partition having a plurality of openings counterbored at the top to provide shoulders therein, a deck in said lower compartment closely adjacent to the lower surface of said partition, and a grating supported in the upper compartment having apertures registering vertically with the bores in said partition.

3. A bee hive including a body having a removable lid and provided with openings near the bottom for entrance and exit of bees, a horizontal partition mounted in the body and dividing it into upper and lower compartments, said partition having a plurality of openings counterbored at the top to provide shoulders therein, and an inverted jar associated with each opening and having its neck removably fitted in the latter and supported by the shoulder therein, a deck in said lower compartment closely adjacent to the lower surface of the partition, said body being provided with windows through which the jars in the upper compartment may be inspected, a removable grating in the upper compartment and receiving the upper portions of the jars to hold the jars upright, and blinds for said windows.

4. A bee hive including a body having a removable lid and provided with openings near the bottom for entrance and exit of bees, a horizontal partition mounted in the body and dividing it into upper and lower compartments, said partition having a plurality of openings counterbored at the top to provide shoulders therein, an inverted jar associated with each opening and having its neck removably fitted in the latter and supported by the shoulder therein, and an imperforate deck mounted in the body below and close to the partition, said deck being spaced from one side of the lower compartment to provide a slot through which bees may pass, said lid and said deck preventing any great amount of light from entering the space between the deck and lid, said slot being out of vertical registration with any one of said bores, and said deck comprising a landing for the bees.

5. A bee hive including a body having a removable lid and provided with openings near the bottom for entrance and exit of bees, a horizontal partition mounted in the body and dividing it into upper and lower compartments, said partition having a plurality of openings counterbored at the top to provide shoulders therein, an inverted jar associated with each opening and having its neck removably fitted in the latter and supported by the shoulder therein, and a deck mounted in the body below and close to the partition, the deck being spaced from a side of the body to provide a slot through which bees may pass.

MINTIE P. ELLIOTT.

REFERENCES CITED

The following references are of record in the file of this patent:

UNITED STATES PATENTS

| Number | Name | Date |
|---|---|---|
| 176,347 | Perrine | Apr. 18, 1876 |
| 200,931 | Park | Mar. 5, 1878 |
| 1,073,458 | Anderson | Sept. 16, 1913 |
| 1,073,459 | Anderson | Sept. 16, 1913 |
| 1,144,878 | Tenyak | June 29, 1915 |